March 9, 1965

J. W. RYAN 3,172,666

GAME FOR TEACHING THE INTERRELATIONSHIPS
OF A PLURALITY OF ENGAGED GEARS

Filed Feb. 8, 1963

JOHN W. RYAN
INVENTOR.

BY Albert M. Herzig
ATTORNEY.

March 9, 1965  J. W. RYAN  3,172,666
GAME FOR TEACHING THE INTERRELATIONSHIPS
OF A PLURALITY OF ENGAGED GEARS
Filed Feb. 8, 1963  3 Sheets-Sheet 2
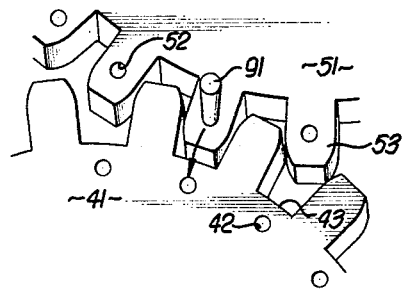
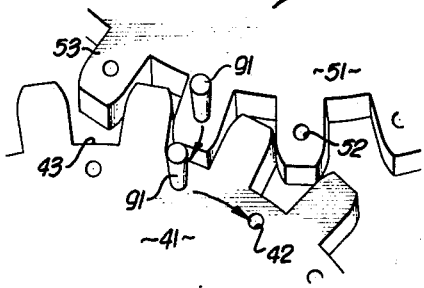
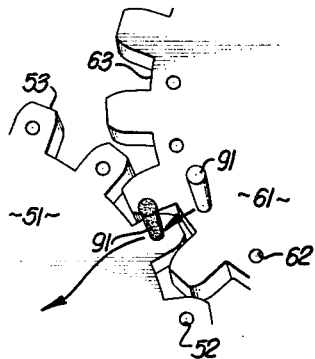
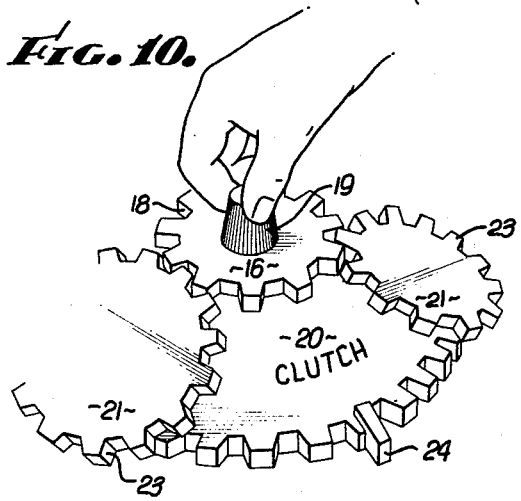
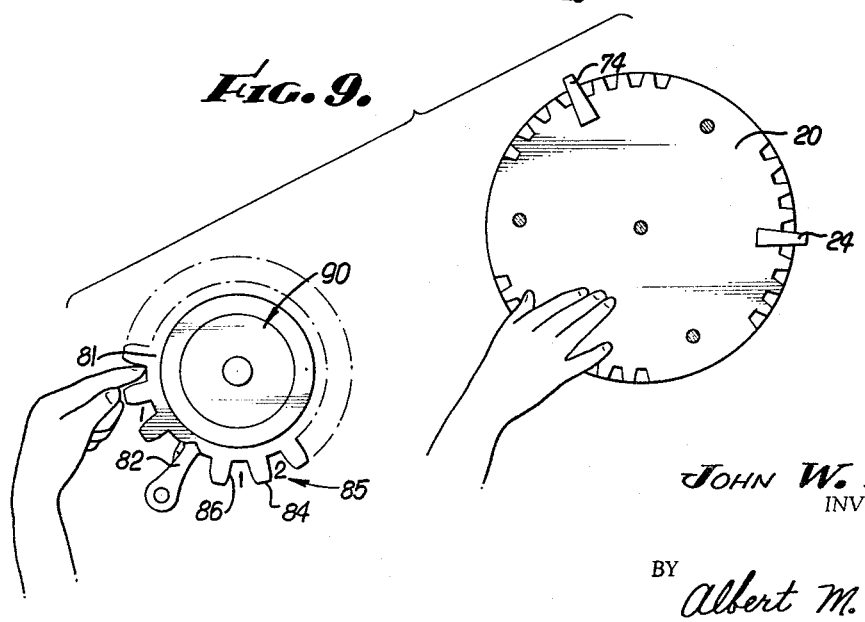
JOHN W. RYAN
INVENTOR.
BY Albert M. Herzig
ATTORNEY.

March 9, 1965
J. W. RYAN
3,172,666
GAME FOR TEACHING THE INTERRELATIONSHIPS
OF A PLURALITY OF ENGAGED GEARS
Filed Feb. 8, 1963
3 Sheets-Sheet 3
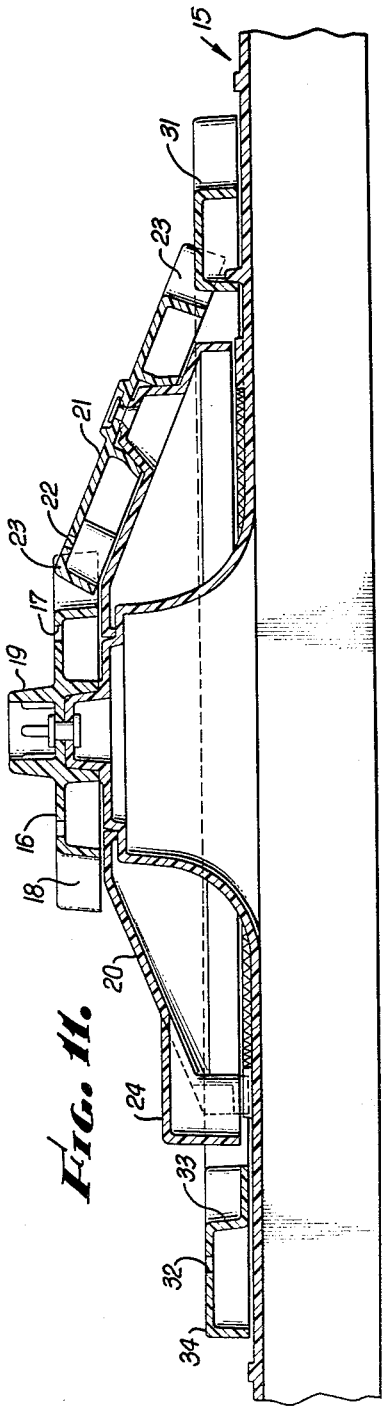
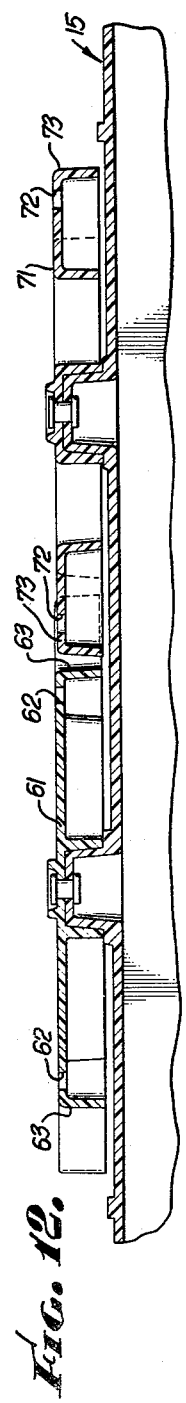
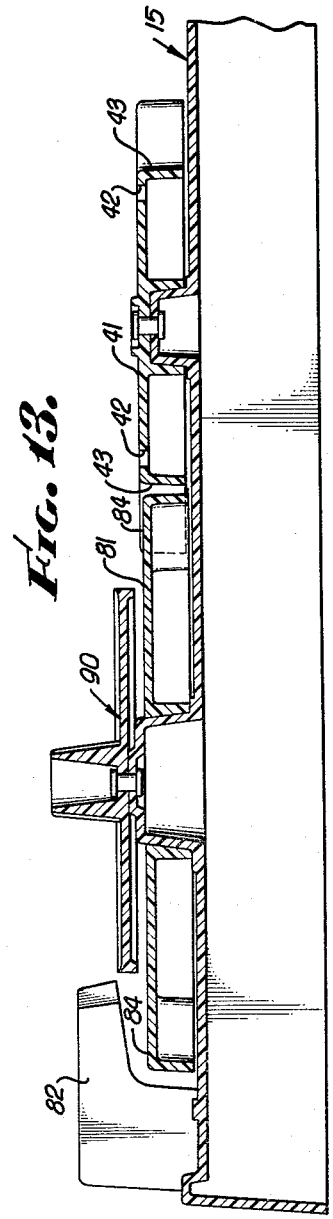
JOHN W. RYAN
INVENTOR.
BY Albert M. Herzig
ATTORNEYS.

United States Patent Office 3,172,666
Patented Mar. 9, 1965

3,172,666
GAME FOR TEACHING THE INTERRELATION-
SHIPS OF A PLURALITY OF ENGAGED GEARS
John W. Ryan, Bel Air, Calif., assignor to Mattel, Inc.,
Hawthorne, Calif., a corporation of California
Filed Feb. 8, 1963, Ser. No. 257,218
13 Claims. (Cl. 273—134)

In general, the present invention relates to an instructive amusement device adapted to illustrate and teach the interrelationships of a plurality of engaged gears.

Many of the more complicated pieces of machinery used in modern industry commonly employ a series of gears or gear trains to accomplish the result desired for the particular piece of machinery. Such series of gears or gear trains are usually relatively difficult for the average adult to understand and work with and thus normally would present an insolvable problem for most children. Consequently, when it is desired to explain in detail workings of such machinery to either adults or children, such series of gears represents a serious impediment to the complete understanding of the operation of such machinery. Furthermore, the normal explanation of the operation of a series of gears may be technically straight-forward. However, because of the nature of the subject matter, it is also usually very difficult to maintain the interest and attention of the adult or child to whom such explanation is being made. In addition, once an adult or child thoroughly understands and appreciates even one complicated gear series, it is usually much simpler and more interesting for such person to appreciate and understand any other simple or complicated gear system.

Consequently, an object of the present invention is an instructive amusement device adapted to illustrate and teach the interrelationships of a plurality of engaged gears.

Another object of the present invention is an amusement device wherein the competitive aspects of a game are utilized to provide incentive for the players of the game to learn the various interrelationships of a plurality of engaged gears.

Other objects and advantages of the present invention will be readily apparent from the following description and drawings which illustrate a preferred exemplary embodiment of the invention.

In general, the present invention involves a device comprising at least one rotatably-mounted gear having means for holding a marker in a plurality of positions spaced around its circumference. Engaged with said one gear is a rotatably-mounted other gear also having means for holding a marker in a plurality of positions spaced around its circumference. Both of said holding means are adapted to position markers directly opposite each other substantially on a line connecting the centers of said gears.

In order to facilitate understanding of the present invention, reference will now be made to the appended drawings of the preferred specific embodiment of the present invention. Such drawings should not be construed as limiting the invention which is properly set forth in the appended claims.

In the drawings:

FIGS. 6–8 are detail views of the engagement of two gears showing possible moves of markers thereon.

FIGS. 9 and 10 are detail views of the differential gears of the present invention showing possible moves of markers thereon.

FIG. 11 is a cross-sectional view of FIG. 1 taken along the lines 11—11 of FIG. 1.

FIG. 12 is a cross sectional view of FIG. 1 taken along the lines 12—12 of FIG. 1.

FIG. 13 is a cross-sectional view of FIG. 1 taken along the lines 13—13 of FIG. 1.

Figure 1:
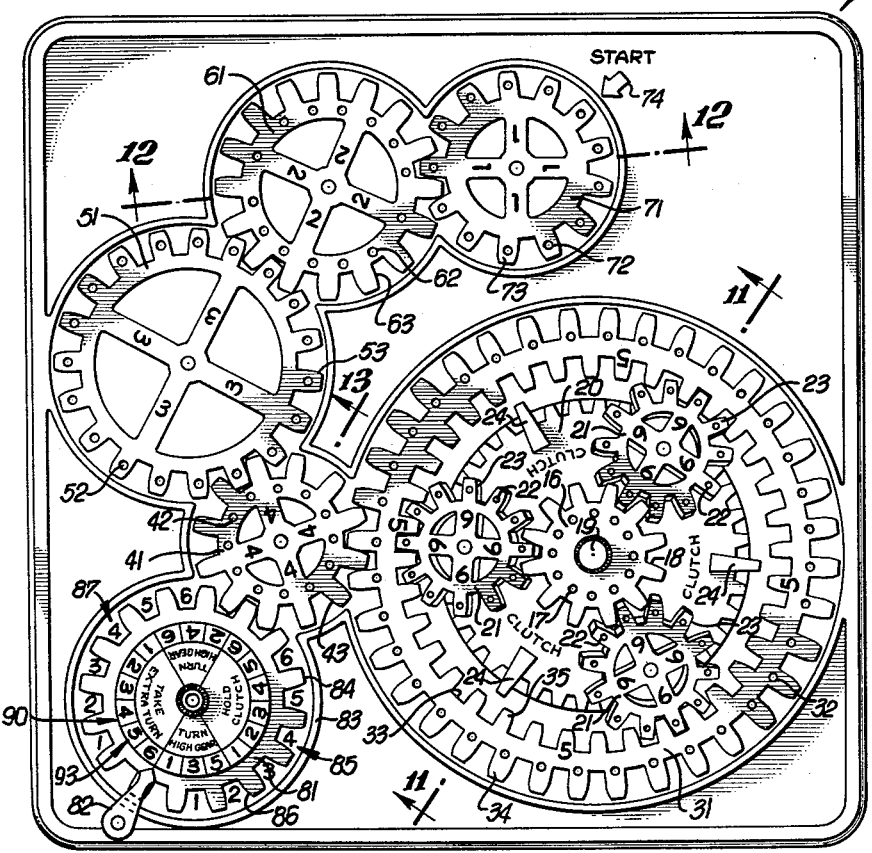
FIG. 1 is a plan view of the instructive amusement device of the present invention.
Figure 2:
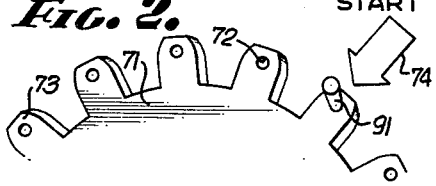
FIG. 2 is a detail view of one of the gears of the present invention.

In general, the instructive amusement device of the present invention comprises a panel 15 on which a first gear or a high gear 16 is rotatably mounted. The first gear 16 has a plurality of holes 17 spaced around its circumference adjacent to its notches 18. First gear 16 also has a knob 19 mounted thereon adapted to facilitate the manual rotation of the first gear 16.

Coaxially and rotatably mounted with respect to the first gear 16 is a clutch disc 20. Clutch disc 20 has three equally spaced pointer lugs 24 positioned around its circumference which may be lined up with an inside tooth 35 on the third gear or ring gear 31. Rotatably mounted on the clutch disc 20 is at least one second gear 21 which is engaged with the first gear 16 and adapted to circle around the first gear 16. As illustrated, there are three second gears 21 equally spaced around the circumference of the first gear 16 and each of the second gears has a plurality of holes 22 spaced around its circumference adjacent its teeth 23. Thus, the first and second gear holes 17 and 22, respectively, are adapted to be positioned directly opposite each other substantially on a line connecting the centers of the gears 16 and 21.

Engaged with the second gears 21 is a third gear or ring gear 31 which is rotatably mounted on the panel 15. The third gear 31 has a plurality of holes 32 therein spaced around its circumference adjacent to its notches 33 on its inner circumference and adjacent its teeth 34 on its outer circumference. Thus the second gears 21 and the third gear 31 holes are adapted to be positioned directly opposite each other substantially on a line connecting the centers of said gears.

Engaged with the third gear 31 is a fourth gear 41 rotatably mounted on the panel 15. The fourth gear 41 has a plurality of holes 42 spaced around its circumference adjacent its notches 43. Thus the third gear holes 32 and the fourth gear holes 42 are adapted to be positioned directly opposite each other substantially on a line connecting the centers of said gears.

Engaged with said fourth gear 41 is a fifth gear 51 which is rotatably mounted on the panel 15. The fifth gear 51 has a plurality of holes 52 spaced around its circumference adjacent its teeth 53. The fourth gear holes 42 and the fifth gear holes 52 are thus adapted to be positioned directly opposite each other substantially on a line connecting the centers of said gears.

Engaged with said fifth gear 51 is a sixth gear 61 rotatably mounted on the panel 15. The sixth gear 61 has a plurality of holes 62 spaced around its circumference adjacent to its notches 63. Thus the fifth gear holes 52 and the sixth gear holes 62 are adapted to be positioned directly opposite each other substantially on a line connecting the centers of said gears.

Engaged with the sixth gear 61 is a seventh gear 71 rotatably mounted on the panel 15. The seventh gear 71 has a plurality of holes 72 spaced around its circumference adjacent its teeth 73. The sixth gear holes 62 and the seventh gear holes 72 are thus adapted to be positioned directly opposite each other directly on the line connecting the centers of said gears. In addition, the seventh gear 71 has a start index 74 with which the seventh gear holes 72 may be aligned.

It should be noted that the fourth gear 41, the fifth gear 51, the sixth gear 61 and the seventh gear 71 constitute a series of gears with each of said gears being engaged with at least one other adjoining gear in said series of gears. Such gears each have a plurality of holes spaced around the circumference and each gear and adjoining gear holes are adapted to be positioned directly opposite each other substantially on a line connecting the centers of such gear and adjoining gear. The gear at one end of said series of gears, i.e. in this case the fourth gear 41, is engaged with the third gear 31.

Engaged with the fourth gear 41 is a dial gear 81 which is rotatably mounted on the panel 15. However, it should be noted that the dial gear 81 could be engaged with any one or more of the third gear 31, the fourth gear 41, the fifth gear 51, the sixth gear 61, or the seventh gear 71. The dial gear 81 has a fixed stop 82 mounted above its rim 83 so that the dial gear teeth 84 pass thereunder. A consecutive series of numbers 85 is printed on the panel 15 clockwise around the dial gear 81 with the lowest number adjacent the stop 82. Each of said numbers is positioned so that it is adjacent a corresponding notch 86 in the dial gear 81 when one of the teeth 84 of the dial gear is underneath the stop 82. Furthermore, the lowest number of the series of numbers 85 (i.e. No. 1) is located adjacent the second notch from the stop 82 when one of the teeth 84 of the dial gear 81 is positioned under the stop 82, i.e. the notch immediately adjoining the stop 82 in such dial gear position is not numbered. Also, a second sequence of numbers 87 is printed on the panel 15 counterclockwise around the dial gear 81 and said second sequence of numbers 87 is positioned substantially similar to the first sequence of numbers 85. Coaxially and rotatably mounted on the dial gear 81 is a spinner 90. The spinner 90, after an initial rotation is imparted thereto, is adapted to randomly select an angular position on the dial gear 81.

The operation of the device of the present invention may best be explained in connection with the rules of a game which may be played thereon. However, it should be noted that the game described below is only one of many games which may be played on this device and which affords insight into the operation of such a complex series of gears. A game which may be played with such device involves two to four players with each player having four pegs or markers in his own color. Such pegs are adapted to be inserted into the holes around the circumference of said gears and to be thus carried by the gears after insertion. Several of the pegs 91 are illustrated in FIGS. 2 and 6–8, respectively. The object of the game is to move the pegs from the seventh gear 71 up on to the first gear 16 and the winner of the game is the first player to move all four of his pegs from the seventh gear up onto the first gear. Also, each player has chances to send the other players' pegs back as they move their own pegs forward.

Figure 3:
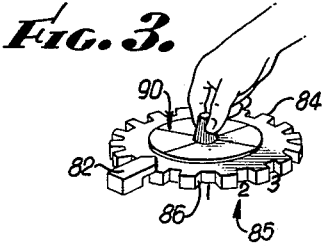
FIGS. 3–5 are perspective views of the dial gear of the present invention showing its operation.
Figures 4, 5:
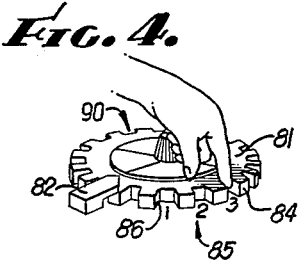

The first player on his first turn places one peg 91 in the hole directly opposite the start index 74 on the seventh gear (FIG. 2) 71. The first player then imparts initial rotation to the spinner 90 mounted on the dial gear 81 (FIG. 3). When the spinner 90 stops, it randomly selects an angular postion on the dial gear 81 which in turn causes a selection of one of the numbers 93 printed on the dial gear. The first player then puts his finger in the notch with that number on one side of the dial gear (FIG. 4). The player may choose either side of the dial gear in order to rotate it in the direction he desires. The first player then pushes the dial gear 81 with his finger until his finger hits the fixed stop 82 (FIG. 5). Then it is the next player's turn and he plays as described above. It should be noted that before the first player makes his move it should be ascertained that the stop 82 of the dial gear 81 is centered over a tooth 84 of the dial gear. It should also be noted that the player must finish his move in the chosen direction after he has initiated the rotation of the dial gear so that the dial gear is pushed all the way to stop.

After the first player has entered his first peg on his first turn he must keep entering the rest of his pegs. On each turn, he may enter one peg in the hole opposite the start index 74 unless the hole 72 is filled with another peg, even one of his own. When that happens, the first player must wait until his next turn to enter a peg, but he can still spin for a number and turn the dial gear 81 to advance his other pegs. On each player's turn, he may choose to move fewer spaces than the number selected by the spinner 90 and forfeit or give up the rest of his spaces, but he must tell the other players what he plans to do. However, the player must take at least one space of his move.

At the end of each player's turn, if his peg is lined up exactly opposite an empty hole on the next gear, i.e. a gear closer to the first gear 16, the player can move his peg up into that hole (FIG. 6). However, the peg must be positioned directly opposite the holes substantially on a line connecting the centers of the gears, as illustrated in FIG. 6. If, at the end of the player's turn, there is one of his own pegs in the hole opposite his peg on the next gear, that peg may be moved to the nearest empty hole on either side of the same gear and then his second peg moved up into the now empty hole (FIG. 7). Furthermore, if the player's peg on the fourth gear 41 is also lined up exactly opposite an empty hole on one of the second gears 21, he may jump over the third gear 31 and place his peg in the empty hole on the second gear (FIG. 1). Finally, when a player moves his peg to an empty hole on the high gear 16, then it should be taken off and kept so that it is the finish for that peg.

If, at the end of any player's turn, any other player's peg is lined up exactly opposite an empty hole on the next higher gear, the player playing must move it up to that empty hole. If the hole opposite the other player's peg is occupied by another peg, the other player's peg is not moved up. On the other hand, if at the end of any player's turn there is another player's peg in the hole on the next higher gear exactly opposite the playing player's peg, the playing player can remove such "enemy peg" (FIG. 8). Such removed peg is given to the player who owns it and the playing player moves his peg into the now empty hole. The other player must enter that peg of his at the start index 74 as soon as he can.

If at the end of any player's turn an enemy peg is lined up exactly opposite an empty hole on a lower gear, the playing player can move the enemy peg back into that empty hole. When the "enemy" player takes his next turn, he cannot move that peg until he takes his turn on the dial gear. However, a limitation on such sending back on an enemy peg is that one can only send back an enemy peg to the lower gear or remove it if, at the end of the playing player's turn, the player has actually rotated the gear that the enemy peg was on. If the gear remains motionless, the enemy peg cannot be sent back. Only the player whose turn it is may advance or send back enemy pegs, and only at the end of his turn. However, no peg may be sent back from the high gear.

Whenever the spinner 90 points to one of the free choice moves, the player can use the free choice move or not, as he wishes. The free choice move takes the place of a regular move and is to advance the player's peg onto the second gear and then onto the first gear and finish. Or it may be used to remove or send back enemy pegs. One free choice move is to hold the clutch which causes the second through the seventh gears to rotate. Thus the player holds one of the pointer lugs 24 on the clutch disc 20 and with his other hand makes his number move on the dial gear 81 as on a regular turn (FIG. 9). Another free choice move is to turn the high gear 16 which makes the first and second gears only to rotate. Thus the player grasps the knob 19 on the high gear 16 and turns it to count the number which was spun, using any of the pointer lugs on the clutch disc to count from tooth to tooth on the inside of the third gear 31 (FIG. 10).

Many other specific embodiments of the present invention will be obvious to one skilled in the art in view of this disclosure. For example, as noted above, many other games may be played on this device by varying the rules of the game. Thus for example, there may be extra turn areas on the dial gear 81 to permit the players to get one or more extra turns. Furthermore, although a series of four gears has been utilized in conjunction with the first, second and third gears, any number of gears may be utilized therewith from, for example, one to ten gears. Also, other gear arrangements may be used in place of the series of the first three gears.

There are many features of the present invention which clearly show the significant advance the present invention represents over the prior art. Consequently, only a few of the outstanding features will be pointed out to illustrate the unexpected and unusual results attained by the present invention. One feature of the present invention is a series of gears with each of the gears being engaged with at least one other adjoining gear in the series and each having means for holding a marker in a plurality of positions spaced around its circumference, such as a plurality of holes. The gear and adjoining gear holes are adapted to be positioned directly opposite each other substantially on a line connecting the centers of the gear and adjoining gear. Thus, when a peg is inserted in one of the holes on each of the gears it is easy to see the amount of relative rotation of the gears when all the gears in the series are rotated. Another feature of the present invention is the utilization of a first gear with at least one rotatably mounted second gear engaged therewith and with the second gear being adapted to circle around the first gear. Thus, when pegs are inserted in the holes of said first and second gears a player is able to judge the relative rotation of such varying gear sizes. Also, the second gears may be meshed in the inner teeth of a third or ring gear and rotatably mounted on a clutch disc. Such feature, besides illustrating the respective rotation of the various gears, also illustrates the operation of the differential gear mechanism in that either the first or third gear may be maintained stationary while the remaining two gears are rotated. Another feature of the present invention is the requirement that the relative rotation of each and every gear in the series be repeatedly judged by each player during his turn so that he can accurately estimate the proper positioning of his own pegs and the enemy pegs. Such repeated judgment forces each player to become familiar with the various interrelationships of the series of gears.

It will be understood that the foregoing description and examples are only illustrative of the present invention and it is not intended that the invention be limited thereto. All substitutions, alterations and modifications of the present invention which come within the scope of the following claims, or to which the present invention is readily susceptible without departing from the spirit and scope of this disclosure are considered part of the present invention.

I claim:

1. An instructive amusement device adapted to illustrate and teach the interrelationships of a plurality of engaged gears comprising:
   (a) a rotatably-mounted first gear having a plurality of holes spaced around its circumference;
   (b) at least one rotatably-mounted second gear engaged with said first gear, said second gear being adapted to circle around said first gear and having a plurality of holes spaced around its circumference, said first and second gear holes being adapted to being positioned directly opposite each other substantially on a line connecting the centers of said gears;
   (c) a rotatably-mounted third gear engaged with said second gear, said third gear having a plurality of holes spaced around its circumference and said second and third gear holes being adapted to being positioned directly opposite each other substantially on a line connecting the centers of said gears;
   (d) a rotatably-mounted fourth gear engaged with said third gear, said fourth gear having a plurality of holes spaced around its circumference and said third and fourth gear holes being adapted to being positioned directly opposite each other substantially on a line connecting the centers of said gears;
   (e) a rotatably-mounted fifth gear engaged with said fourth gear, said fifth gear having a plurality of holes spaced around its circumference and said fourth and fifth gear holes being adapted to being positioned directly opposite each other on a line connecting the centers of said gears;
   (f) a rotatably-mounted sixth gear engaged with said fifth gear, said sixth gear having a plurality of holes spaced around its circumference and said fifth and sixth gear holes being adapted to being positioned directly opposite each other substantially on a line connecting the centers of said gears;
   (g) a rotatably-mounted seventh gear engaged with said sixth gear, said seventh gear having a plurality of holes spaced around its circumference and said sixth and seventh gear holes being adapted to being positioned directly opposite each other substantially on a line connecting the centers of said gears;
   (h) a rotatably-mounted dial gear engaged with one of said third, fourth, fifth, sixth and seventh gears, said dial gear being adapted to rotate the gear engaged therewith through a selected angle;
   (i) a pin mounted in one of said holes in said seventh gear, said pin being transferrable to said holes in said sixth, fifth, fourth, third, second, and first gears successively when associated holes become positioned opposite each other; and
   (j) spinner means rotatably mounted on said dial gear for indicating the amount of rotation to be imparted to said dial gear to rotate the gear engaged therewith through said selected angle, thereby advancing said pin toward its point of alignment with an associated hole.

2. A device as stated in claim 1 which includes three second gears equally spaced around the circumference of said first gear.

3. A device as stated in claim 1 which includes a clutch disc coaxially and rotatably mounted with respect to said first gear, said second gear being mounted on said clutch disc.

4. A device as stated in claim 1 wherein said first gear has a knob mounted thereon adapted to facilitate the manual rotation of said first gear.

5. A device as stated in claim 1 wherein said dial gear has a fixed stop mounted superjacent thereto in its path of travel, said stop being engageable by the means employed to rotate said dial gear to stop further rotation thereof.

6. A device as stated in claim 1 wherein said gears have teeth and notches and wherein the holes spaced around the circumference of said gears are located in the teeth of at least one gear and adjacent the notches of another gear engaged with said one gear.

7. An instructive amusement device adapted to illustrate and teach the interrelationships of a plurality of engaged gears comprising:
   (a) first rotatably-mounted gear means, said first gear means being provided with means for holding a marker;
   (b) second rotatably-mounted gear means engaged with said first gear means, said second gear means having means for holding a marker, said holding means on said first gear means being alignable with said holding means on said second gear means at the point of engagement of said second gear means with said first gear means:
   (c) marker means carried by one of said holding means, said marker means being transferrable to the other of said holding means when said one holding means is aligned therewith; and
   (d) chance means mounted adjacent one of said gear means for indicating the amount of angular movement to be imparted to said one holding means by rotating its associated gear means a predetermined amount to advance said one holding means toward its point of alignment with said other holding means.

8. A device as stated in claim 7 wherein said marker holding means comprises a plurality of holes spaced around the circumference of each of said gear means.

9. A device as stated in claim 8 wherein said gear means include teeth and notches and wherein the holes spaced around the circumference of said gear means are located in the teeth of one of said gear means and adjacent the notches of the other of said gear means.

10. An instructive amusement device adapted to illustrate and teach the interrelationships of a plurality of engaged gears comprising:
 (a) a first gear having means for holding a marker in a plurality of positions spaced around its circumference;
 (b) at least one rotatably-mounted second gear engaged with said first gear, said second gear being adapted to circle around said first gear and having means for holding a marker in a plurality of positions spaced around its circumference, said holding means on said second gear being alignable with said holding means on said first gear at the point of engagement of said second gear with said first gear;
 (c) marker means carried by one of said holding means, said marker means being transferrable to the other of said holding means when said one holding means is aligned therewith; and
 (d) chance means mounted adjacent one of said gears for indicating the amount of angular movement to be imparted to said one holding means by rotating its associated gear means a predetermined amount to advance said one holding means toward its point of alignment with said other holding means.

11. A device as stated in claim 10 which includes a rotatably-mounted third gear engaged with said second gear, said third gear having means for holding a marker in a plurality of positions spaced around its circumference, said holding means on said third gear being alignable with said holding means on said first and second gears at the points of engagement of said gears with each other.

12. A device as stated in claim 10 which includes three second gears equally spaced around the circumference of said first gear and a clutch disc coaxially and rotatably mounted with respect to said first gear, said second gears being mounted on said clutch disc.

13. A device as stated in claim 11 which includes a series of gears with each of the gears in said series being engaged with at least one other adjoining gear in said series of gears and having means for holding a marker in a plurality of positions spaced around its circumference, each of said holding means for said series of gears being alignable with the holding means of an engaged gear at the point of engagement therewith, the gear at one end of said series of gears being engaged with said third gear.

References Cited in the file of this patent
UNITED STATES PATENTS 2,095,046    Wilner                Oct. 5, 1937
2,477,441    Cole                  July 26, 1949